United States Patent [19]

Haxell et al.

[11] Patent Number: 5,053,079
[45] Date of Patent: Oct. 1, 1991

[54] DISPERSED PIGMENTED HOT MELT INK

[75] Inventors: John P. N. Haxell, Bath; Edward A. Brown, Kent; Derek E. Wilson, Somerset, all of Great Britain

[73] Assignee: Coates Electrographics Limited, Bath, United Kingdom

[21] Appl. No.: 528,105

[22] Filed: May 23, 1990

[51] Int. Cl.$^5$ .......................... C09D 11/12; C08L 91/6
[52] U.S. Cl. ........................................ 106/31; 106/30; 106/272
[58] Field of Search ....................... 106/30, 31, 272, 27

[56] References Cited

U.S. PATENT DOCUMENTS

| | | | |
|---|---|---|---|
| 4,272,292 | 6/1981 | Mizuno et al. | 106/31 |
| 4,732,815 | 3/1988 | Mizobuchi et al. | 428/195 |
| 4,778,729 | 10/1988 | Mizobuchi | 428/195 |
| 4,851,045 | 7/1989 | Taniguchi | 106/22 |

OTHER PUBLICATIONS

The Condensed Chemical Dictionary, Tenth Ed., Revised by Gessner G. Hawley, pp. 615 and 1094.

*Primary Examiner*—William R. Dixon, Jr.
*Assistant Examiner*—Mary C. DiNunzio
*Attorney, Agent, or Firm*—Brumbaugh, Graves, Donohue & Raymond

[57] ABSTRACT

In the embodiments described in the specification, a dispersed, pigmented hot melt ink contains a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle. Preferred is the isocyanate-modified microcrystalline wax marketed as Petrolite WB17.

7 Claims, No Drawings

DISPERSED PIGMENTED HOT MELT INK

BACKGROUND OF THE INVENTION

This invention relates to hot melt inks containing dispersed pigments and, more particularly, to a pigmented hot melt ink in which the pigment dispersion is effectively stabilized.

Pigmented hot melt inks have significant advantages over hot melt inks containing dyes. One advantage is that pigments tend to be more light-fast than dyes, which is an important factor in connection with the storage of printed images. In addition, pigments tend to be more heat-stable than dyes and this is especially important when the ink is a hot melt ink applied at an elevated temperature of, for example, 80°–150° C. Furthermore, pigments are less likely than dyes to bleed or sublime and they may be either opaque or transparent, whereas dyes are transparent and have little covering power.

Heretofore, however, dyes have usually been preferred for use in hot melt inks, particularly for ink jet inks, since they are completely dissolved in the medium and cannot settle whereas, pigments being suspended and dispersed, may settle to the bottom of a reservoir or agglomerate to block ink jet ink nozzles.

In inks containing a liquid vehicle such as water or oil, pigments such as carbon black, phthalocyanine blue, lithol rubine and diarylide yellow have previously been used and surface-active materials or the like have been added to such inks in order to wet the pigment and break agglomerates of primary pigment particles, disperse the pigment to develop color strength, and stabilize the pigment from settling or agglomerating. In hot melt inks such as those containing hydrocarbon waxes and polymers which are used at elevated temperatures, it has been found that such surface-active materials do not provide adequate particle wetting or dispersion stability. Among the additives used in liquid-vehicle inks which have been found to be essentially ineffective as pigment dispersants and pigment stabilizers in hot melt inks are alkyd polymers, materials containing amphipathic molecules such as Solsperses®, lecithins, alkylated polyvinyl pyrrolidones, metal soaps, stearic acid, paraffin wax, polyethylene wax, carnauba wax, candelilla wax, montan wax, hydrogenated castor oil, microcrystalline wax, behenic acid, aluminum stearate, synthetic ester waxes, oxidized polyethylene waxes, lauric acid, Fischer-Tropsch waxes, esparto waxes, dammar wax, oxazoline wax, bisamide waxes, amide waxes, oleamides, stearamides, lauramides, erucamide, glycerol monostearate, glycerol tristearate, chlorinated waxes, cetyl alcohol, stearone, laurone, diphenyl phthalate, dicyclohexyl phthalate, camphor, triphenyl phosphate, n-ethyl toluene sulphonamide, n-cyclohexyl-p toluene sulphonamide and other natural and synthetic polymers and resins.

Moreover, even if such prior art additives were effective, many of them would not be useful in hot melt inks because they tend to degrade or evaporate at high temperature or to impart an undesired color to the ink or are otherwise incompatible with the ingredients of a hot melt ink. Furthermore, where hot melt inks are intended for use in an ink jet printer, for example, the physical properties of the ink must be carefully controlled to assure proper operation of the printer. Consequently, any additive which may affect the physical properties of the ink is undesirable. Also, pigmented hot melt inks tend to flocculate or agglomerate after extended exposure to high temperature and high shear stress to which they are subjected in a hot melt ink jet system.

SUMMARY OF THE INVENTION

Accordingly, it is an object of the present invention to provide a pigmented hot melt ink which overcomes the above-mentioned disadvantages of the prior art.

Another object of the invention is to provide a highly dispersed pigmented hot melt ink suitable for use in a hot melt ink jet printer.

A further object of the invention is to provide a hot melt ink composition having excellent pigment dispersion as well as suspension stability at elevated temperatures.

These and other objects of the invention are attained by providing a pigmented hot melt ink containing an isocyanate-modified microcrystalline wax or a lignite wax as a dispersing agent. Preferably, the dispersing agent is present in an amount of 2.5% to 20%, and, if desired, it may be present in amounts of from 2% to 100% or more of the weight of the ink vehicle.

DESCRIPTION OF PREFERRED EMBODIMENTS

Pigmented hot melt inks are normally solid at room temperature, but are liquefied for use by heating to a temperature above room temperature such as at least 50° C. Accordingly, the vehicle for a hot melt ink may be any suitable hydrocarbon polymer, wax or waxlike material or $C_{14-24}$ fatty acid or ketone thereof, such as stearic acid, stearone, lauric acid or laurone, n-cyclohexyl p-toluene sulphonamide and so on, plus the following polymeric materials, e.g., cumarone-indene polymer, rosin, rosin ester, hydrogenated resins, cyclic ketone polymers, styrene allyl alcohol polymers, polystyrenes, polyvinyl toluene/methylstyrene polymer, alkyl hydrocarbon polymer, aryl hydrocarbon polymers, alkyl aryl hydrocarbon polymer, terpene polymers, styrene-acrylates, ethylene-vinyl acetates, polypropylene, gilsonite and other asphaltic materials, cyclic hydrocarbon polymer, halogenated polymers, polyester polymers or a mixture of two or more of such materials which has a melting point in the desired range, such as at least 50° C. and up to, for example, 160° C. If the hot melt ink is to be used in ink jet printing, the vehicle should also have the appropriate physical properties, such as viscosity and surface tension at the temperature of use which are required for that application. For this purpose, the vehicle may include viscosity and surface tension modifiers.

In order to impart the desired ink color, one or more colored pigments are included in amounts of, for example, 1% to 4% by weight. Amongst pigments that may be successfully used are the following: pigment yellows 1, 3, 12, 13, 14, 16, 17, 73, 74, 81, 83, 97, 98, 106, 113, 114; pigment reds 2, 3, 4, 5, 6, 7, 8, 9, 12, 14, 37, 38, 48:1, 48:2, 48:3, 48:4, 57:1, 57:2, 57:3, 88, 122, 146, 147; pigment blues 15:1, 15:2, 15:3, 15:4, 56, 61, 61:1; and pigment black 1, 20, carbon black, acetylene black, bone black, lamp black, graphite, etc. Since the ink is solid while it is stored at room temperature, there is no tendency for the pigment to agglomerate during storage. When the ink is used, however, it is maintained in a molten condition at elevated temperature, and the pigment particles may tend to agglomerate even though the ink is stirred or agitated. Conventional dispersing agents used in inks which are liquid at room temperature are often ineffective to prevent significant agglomeration in hot melt inks at elevated temperatures. Moreover, as mentioned above, some conventional dispersing agents tend to modify the physical and optical properties of the hot melt ink in an undesired manner.

To overcome these problems, the hot melt ink of the invention includes an isocyanate-modified microcrystalline wax or a lignite wax as a dispersing agent. Such dispersing agents have been found to produce excellent pigment dispersion and to be compatible with low-polarity hydrocarbons used as vehicles, to have low volatility and excellent heat stability at temperatures up to 160° C. and higher, and are effective in low amounts that tend not to adversely affect the ink color. Moreover, such dispersing agents are effective with many types of pigment in nonpolar ink vehicles. In order to be most effective, the concentration of the dispersing agent should be from about 2% to about 100% by weight of the ink vehicle, and preferably from about 2.5% to about 20% of the weight of the ink vehicle. Suitable isocyanate-modified microcrystalline waxes are Alfa Wax CWU003 and the Petrolite products designated in WB5, WB7, WB10, WB11, WB14, WB16 and WB17. Suitable lignite waxes are American Lignite products designated 1650, 20 and 400. Preferably, the dispersing agent is an isocyanate-modified microcrystalline wax and, most preferably, it is a Petrolite ® isocyanate-modified microcrystalline wax of the type designated WB17.

These dispersing agents not only tend to reduce or eliminate pigment settling and agglomeration, they also reduce the tendency of the pigment dispersion to exhibit thixotropy and encourage Newtonian flow behavior as well as acting as pigment-wetting agents to speed up dispersion. In addition, they are capable of use with a wide range of hot melt ink vehicle materials and are nonhazardous and nontoxic and they can maintain pigment suspension through repeated melt-freeze cycles. They also have good heat stability in terms of color, viscosity and volatility.

EXAMPLES 1 AND 2

The following examples demonstrate the effect of an isocyanate-modified microcrystalline wax as a dispersing agent in a linear polyethylene-based hot melt ink. Example 1 is a pigmented hot melt ink without any dispersing agent, whereas Example 2 is the same hot melt ink but includes about 42 weight percent (77 weight percent of the vehicle) of the Petrolite ® isocyanate-modified microcrystalline wax designated WB17. The inks of Examples 1 and 2 were maintained in molten condition and the extent to which the pigment was dispersed was evaluated. The compositions in parts by weight used in the examples and the result of the evaluation are set forth in Table I.

TABLE I

|  | Example | |
|---|---|---|
|  | 1 | 2 |
| Linear polyethylene (MW500) | 52 | 52 |
| Ethylene-vinyl acetate polymer (19% vinyl acetate) | 2 | 2 |
| Carbon black | 2 | 2 |
| Isocyanate-modified microcrystalline wax | — | 40 |
| Pigment dispersion | Very Poor | Excellent |

EXAMPLES 3-6

Two other pigments were dispersed in a vehicle consisting of Excorez 5380 hydrogenated hydrocarbon polymer blended with a glyceryl tribehenate wax with and without the dispersing agent of the invention. The pigment dispersion, melt flow and presence of flocculation were evaluated at 120° C. The ink compositions in parts by weight and the results of the evaluation are given in Table II.

TABLE II

|  | Example | | | |
|---|---|---|---|---|
|  | 3 | 4 | 5 | 6 |
| Hydrogenated hydrocarbon polymer (Escorez 5380) | 24 | 24 | 24 | 24 |
| Glyceryl tribehenate | 65 | 65 | 65 | 65 |
| Quinacridone pigment (PR122) | — | — | 2 | 2 |
| Pigment Yellow 83 | 2 | 2 | — | — |
| Isocyanate-modified microcrystalline wax | — | 10 | — | 10 |
| Pigment dispersion | Poor | Excellent | Poor | Excellent |
| Melt flow (at 120° C.) | Poor | Excellent | Poor | Excellent |
| Flocculation (at 120° C.) | Yes | No | Yes | No |

EXAMPLES 7 AND 8

A hot melt ink consisting of alkylated polyvinyl pyrrolidone, paraffin wax and hydrogenated hydrocarbon polymer was prepared with and without the dispersing agent of the invention. The pigment dispersion, melt flow and pigment suspension stability were evaluated at 120° C. The ink compositions in parts by weight and the results of the evaluation are given in Table III.

TABLE III

|  | Example | |
|---|---|---|
|  | 7 | 8 |
| Alkylated polyvinyl pyrrolidone | 14.4 | 14.4 |
| Paraffin wax 155 | 61.9 | 61.9 |
| Hydrogenated hydrocarbon polymer (Escorez 5380) | 72.8 | 72.8 |
| Pigment Yellow 13 | 3.04 | 3.04 |
| Isocyanate-modified microcrystalline wax | — | 4.0 |
| Pigment dispersion | Poor | Excellent |
| Melt flow (at 120° C.) | Poor | Good |
| Pigment suspension stability (at 120° C.) | Poor | Good |

EXAMPLES 9-12

To determine an appropriate range of concentration of the dispersing agent of the invention, four ink samples were prepared containing varying amounts of the dispersing agent and the suspension stability was evaluated at 120° C. The composition of the ink samples, in parts by weight, and the results of the evaluation are given in Table IV.

TABLE IV

|  | Example | | | |
|---|---|---|---|---|
|  | 9 | 10 | 11 | 12 |
| Hydrogenated castor oil | 12.6 | 12.6 | 12.6 | 12.6 |
| Hydrogenated hydrocarbon polymer | 21.3 | 21.3 | 21.3 | 21.3 |
| Glyceryl tribehenate | 50.4 | 50.4 | 50.4 | 50.4 |
| Phthalocyanine Blue | 1.6 | 1.6 | 1.6 | 1.6 |
| Isocyanate-modified microcrystalline wax | — | 3.0 | 6.0 | 20.0 |
| Pigment suspension | Poor | Good | Very | Excellent |

TABLE IV-continued

| | Example | | | |
|---|---|---|---|---|
| | 9 | 10 | 11 | 12 |
| stability (at 120° C.) | | | Good | |

EXAMPLES 13-15

To provide a comparison with other potential dispersing agents, equal quantities of carnauba wax, hydrogenated castor oil and isocyanate-modified microcrystalline wax were added to three samples of an ink consisting of hydrogenated hydrocarbon polymer, linear polyethylene and glyceryl tribehenate and pigment, and the pigment dispersion of the molten ink was evaluated. The ink compositions, in parts by weight, and the results of the evaluation are shown in Table V.

TABLE V

| | Example | | |
|---|---|---|---|
| | 13 | 14 | 15 |
| Hydrogenated hydrocarbon polymer | 12.6 | 12.6 | 12.6 |
| Linear polyethylene (MW 500) | 10.8 | 10.8 | 10.8 |
| Glyceryl tribehenate | 51.8 | 51.8 | 51.8 |
| Pigment Yellow 14 | 1.5 | 1.5 | 1.5 |
| Pigment Yellow 83 | 1.5 | 1.5 | 1.5 |
| Carnauba wax | 9.0 | — | — |
| Hydrogenated castor oil | — | 9.0 | — |
| Isocyanate-modified microcrystalline wax | — | — | 9.0 |
| Pigment dispersion | Poor | Poor | Good |

Although the invention has been described herein with reference to specific embodiments, many modifications and variations therein will readily occur to those skilled in the art. Accordingly, all such variations and modifications are included within the intended scope of the invention.

We claim:

1. A hot melt ink comprising a thermoplastic vehicle having a melting point above about 40° C., a pigment, and a dispersing agent in an amount effective to disperse said pigment selected from the group consisting of isocyanate-modified microcrystalline waxes and lignite waxes.

2. A hot melt ink according to claim 1 wherein the dispersing agent is an isocyanate-modified microcrystalline wax.

3. A hot melt ink according to claim 1 wherein the dispersing agent is a lignite wax.

4. A hot melt ink according to claim 1 wherein the dispersing agent is present in an amount of from about 2 to about 100 weight percent of the amount of thermoplastic vehicle in the ink.

5. A hot melt ink according to claim 1 wherein the dispersing agent is present in an amount of from about 2.5 to about 20 weight percent of the amount of thermoplastic vehicle in the ink.

6. A hot melt ink according to claim 1 wherein the pigment is present in an amount of from about 1 to about 4 weight percent of the total weight of the ink.

7. A hot melt ink comprising a thermoplastic vehicle having a melting point above about 40° C., a pigment in an amount of from about 1 to about 4 weight percent, and a dispersing agent comprising an isocyanate-modified microcrystalline wax in an amount of from about 2 to about 100 weight percent of the weight of the vehicle.

* * * * *